United States Patent [19]

Milholen et al.

[11] 4,013,183
[45] Mar. 22, 1977

[54] APPARATUS AND METHOD FOR STACKING BRICKS IN PREPARATION FOR STRAPPING

[75] Inventors: William F. Milholen, Siler City; Cletus E. Lineberry, Staley, both of N.C.

[73] Assignee: Forrest Paschal Machinery Co., Siler City, N.C.

[22] Filed: June 25, 1975

[21] Appl. No.: 590,260

Related U.S. Application Data

[62] Division of Ser. No. 469,649, May 14, 1974, Pat. No. 3,924,756.

[52] U.S. Cl. .............................. 214/152; 214/6 A
[51] Int. Cl.² ........................................ B65G 57/26
[58] Field of Search ............... 214/6 A, 6 H, 8.5 C, 214/152; 294/63 R

[56] References Cited

UNITED STATES PATENTS

| | | | |
|---|---|---|---|
| 3,656,634 | 4/1972 | Pearne et al. | 214/6 A |
| 3,731,785 | 5/1973 | Stuart | 214/6 A X |
| 3,834,298 | 9/1974 | Paschal et al. | 214/6 A X |
| 3,917,080 | 11/1975 | Jones | 214/6 A |

FOREIGN PATENTS OR APPLICATIONS 969,527  9/1964  United Kingdom ............... 214/6 H

*Primary Examiner*—L. J. Paperner

[57] ABSTRACT

Bricks are continuously received in double-layer courses, which courses are shifted one at a time onto a receiving plate whereupon a gripper apparatus is activated to grip the opposite sides of the course and retain the course as the receiving plate is removed from beneath the course. A platform is elevated to engage or cause the bricks already deposited thereon to engage the lower surface of the course being held by the gripper apparatus whereupon the gripper apparatus is deactivated. The elevator lowers and the receiving plate is returned to its initial position. During selected course transfers a tyne tray apparatus cooperates with the gripper apparatus to form tyne openings in selected layers. The gripping apparatus itself includes a first set of longer outer gripper plates which are adapted to grip entire courses at times and a plurality of shorter, inner grippers which cooperate with the outer gripper plates or with other inner grippers to grip partial courses after the tyne bricks have been removed.

2 Claims, 14 Drawing Figures

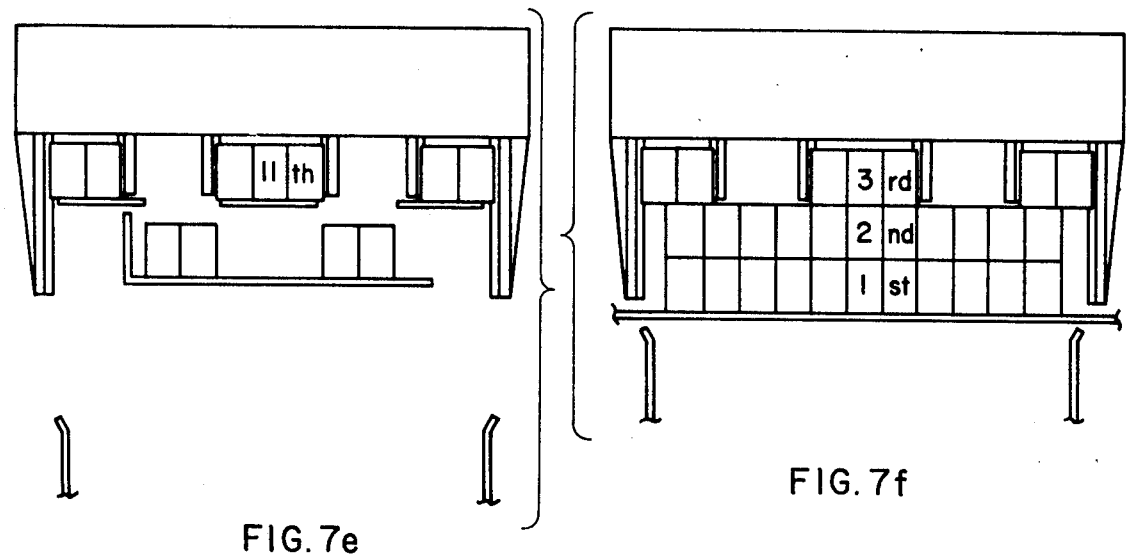
FIG. 7e
FIG. 7f
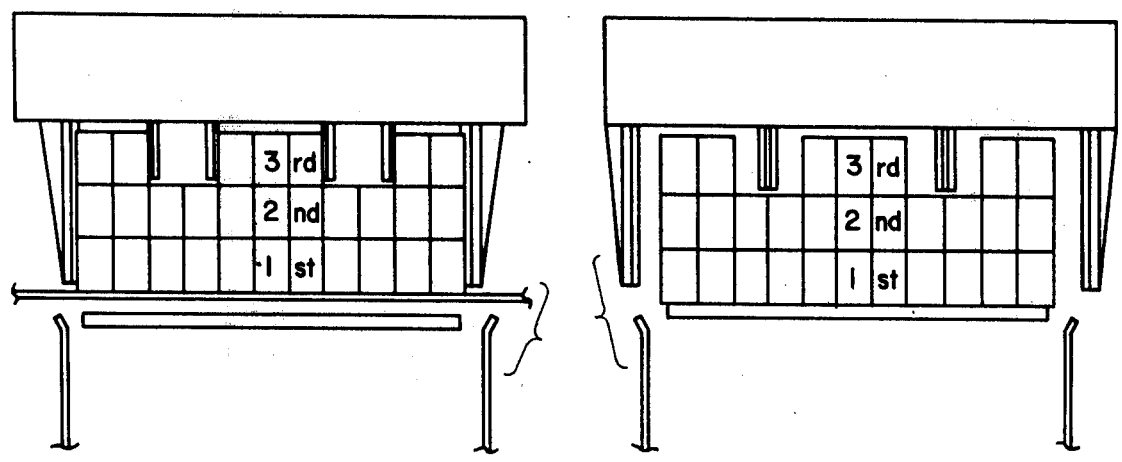
FIG. 7g
FIG. 7h

APPARATUS AND METHOD FOR STACKING BRICKS IN PREPARATION FOR STRAPPING

This is a division of application Ser. No. 469,649, filed May 14, 1974, now U.S. Pat. No. 3,924,756.

BACKGROUND OF THE INVENTION

In processing bricks through brick plants, up until recent years, after fired brick were removed from the kiln, kiln cars were unloaded by hand and formed into stacks of desired configurations. Within the last several years stacking apparatuses have been developed whereby bricks proceeding along a conveyor in single or double layers have been formed into stacks 10 or more courses high, with a strap encircling the courses to form a brick package.

Examples of these previous stackers are disclosed in U.S. Pat. Nos. 2,933,207; 3,392,851; 3,471,036; and 3,738,514.

SUMMARY OF THE PRESENT INVENTION

The present invention is directed to a unique and improved approach to the problem of receiving bricks in double-layer courses and forming such courses into brick stacks of a proper size for strapping. In addition, the apparatus is adapted to form the tyne openings necessary to permit handling of the finished packages by a fork-lift truck.

In this regard, bricks previously arranged on the conveyor or conveyance in a plurality of double-layer courses, each layer having a prescribed number of bricks in each row and column, are transferred into the stacking apparatus by means of a pusher mechanism of conventional design. The stacking apparatus includes first of all a gripper head which grips the side of each course and maintains the course in position while the receiving plate thereunder is moved away and an elevator having a stacking platform attached to the top thereof which is raised to a point where either the platform or the top layer of brick on the platform contacts the bottom of the gripped brick course. At this time, the trippers of the gripper apparatus are released, whereupon the elevator lowers the stacked bricks below the level of the receiving plate, and the receiving plate returns to the elevator in preparation for receiving the next course.

In order to form tyne voids in the brick package, one layer of brick resting on the brick stack is gripped by the gripper head at a prescribed time and raised to a position above the elevator. A movable frame including a tyne removal plate means is inserted beneath the gripper head. The head is then lowered until the aforementioned layer contacts the tyne plate, whereupon the grippers are released allowing the void or tyne brick to at least temporarily drop through openings in the tyne plate. The gripping apparatus then re-grips the brick layer by means of internal expanding grippers and returns them to the elevator in proper sequence to form the tyne void.

Since the brick to be stacked onto the elevator are initially pushed to the same point with no further movement relative to each other, the completed brick stacks do not have the sawtooth or uneven row effect normally achieved by known conventional methods of forming the stack. The present invention also effects the stacking and tyne course building with the same apparatus, thereby reducing system complexity and cost.

The void or tyne brick forming apparatus itself includes a unique slotted plate selectively movable beneath the gripper head to remove selected brick of selected layers. Such previous known methods as illustrated by U.S. Pat. No. 3,731,785 could be rendered inoperative by broken or distorted brick; however, such brick do not effect the operation of the present system.

It is therefore an object of the present invention to provide a simpler and more reliable method and apparatus for stacking bricks in preparation for the strapping operation.

It is further an object of the present invention to provide a brick stacking apparatus which eliminates sawtooth or uneven edges in the final package.

It is yet a further object of the present invention to provide a brick stacking apparatus which performs the tyne building and stacking operations at the stacker, thus resulting in a machine of less complexity and greater liability without a decrease in output.

Other objects of the invention will become apparent upon studying the following detailed description of a preferred embodiment of the invention, and the accompanying drawings in which:

FIGS. 7a–h are operational schematic views illustrating sequentially the method of the present invention.

Figure 1:
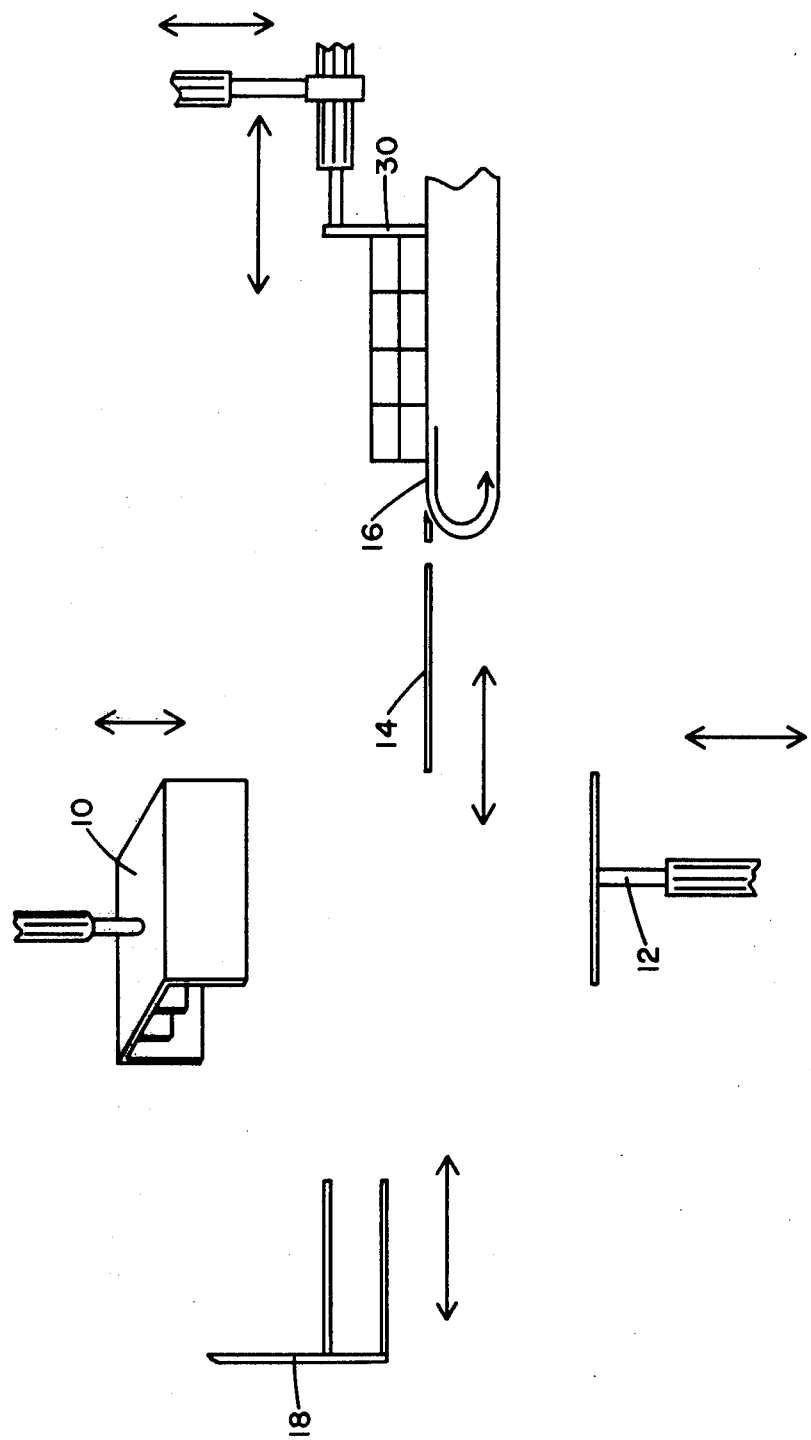
FIG. 1 is a mechanical schematic illustrating the basic construction and operation of the stacker apparatus according to the present invention.

Turning now to the drawings, and in particular to FIG. 1, there is shown schematically the basic concept of the present invention which includes first of all a gripping apparatus 10, and elevator means 12, and a receiving plate 14 when it is in position above elevator means 12 and a second position removed and preferably spaced upwardly therefrom. Receiving plate 14 is reciprocal in a horizontal plane back and forth between a first position intermediate said gripping apparatus and said elevator and a second position removed horizontally from said first position allowing free cooperation between bricks held by the gripping apparatus 10 and the elevator means 12. Bricks are placed on said receiving plate 14 a course at a time with each course including a plurality of rows of bricks stacked two layers high. It should be recognized that the apparatus may also be used with courses which are one layer high or more than two layers high; however, for purposes of illustration and since two layer courses are conventional, the invention is illustrated and described with a preferred embodiment having courses with two layers therein.

The courses are initially grouped in some manner which is not pertinent to the present invention and proceed along a conveyance 16 a course at a time until the end of the conveyance is reached. A pusher means then transfers the bricks a course at a time from the conveyance 16 onto the receiving plate 14.

The other basic feature of the apparatus is the tyne building means 18 which is movable back and forth between a first position beneath the gripper means 10 and a second position removed therefrom. In the first position, the tyne building means 18 receives a predetermined single layer of bricks from the gripping means and presents back to the gripping means the same layer of bricks minus the bricks which have been removed by the tyne building means to form the tyne openings in the predetermined same layer.

Turning now to the specifics of the preferred embodiment, a stationary framework 20 supports the moving parts of the system. The receiving plate 14 is mounted for horizontal movement back and forth across a receiving portion of the framework on a level with conveyance 16 and includes plurality of support rollers 22 rotatably mounted thereto and received within side channel members 24 which form said receiving portion of frame 20. A hydraulic or air cylinder 26 is secured to a stationary member, either the framework or some other stationary element, while the piston thereof is mechanically connected to the receiving plate 14, so that the receiving plate is caused to reciprocate between second position in response to the activation and deactivation of the cylinder 26.

Conveyance 16 terminates adjacent framework 20 so that bricks may be slid from the end of conveyance 16 across a transition plate 17 onto the receiving plate 14 when it is in its receiving position. It should be recognized that the receiving position of receiving plate 14 may be either removed from its first position intermediate the gripper means and the elevator (illustrated in FIG. 2) or the receiving means may receive bricks from the conveyance while in its intermediate position, and then merely moved to its removed position after the gripper means grips and supports the course of bricks in preparation for depositing them on the elevator means. It any event, conveyance 16 comprises a slat conveyor or other similar type conveyor which receives bricks in double layer courses along the length of the conveyor to the end thereof, whereupon a pusher mechanism 30 is activated to transfer a course of bricks longitudinally or transversely from the conveyance 16 onto the receiving plate 14. For convenience the transfer may move the bricks across a transition plate 32.

The pushing mechanism 30 includes a frame 34 which supports a depending pusher plate 36 and has attached thereto a first cylinder and piston assembly 38 which moves the bricks from the conveyance onto the receiving plate and a second vertically oriented piston and cylinder 40 which lifts the pusher plate 36 in preparation for returning it back to its initial position and cleaning the next course of bricks which has been moved onto the end of conveyance 16 in the meantime. The conveyance 16 and pusher mechanism 30 are shown by way of illustration only and do not form a part of the present invention. It should further be noted that conveyance 16 could be positioned perpendicular to the position shown in FIG. 2 so that the bricks are moved onto the end of the conveyance and then transferred transversely onto the receiving plate, rather than longitudinally as illustrated in the preferred embodiment.

Figure 2:
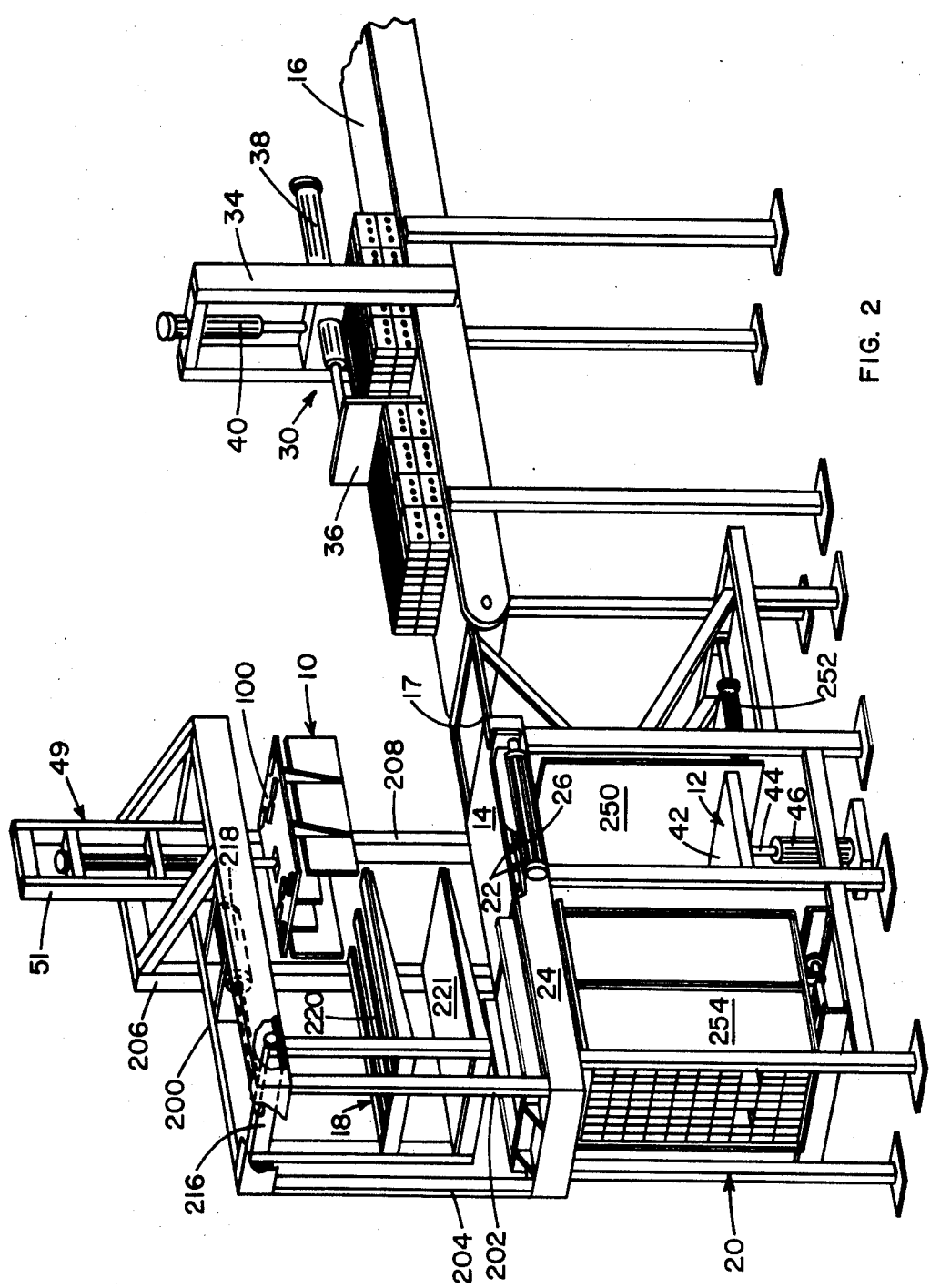
FIG. 2 is a perspective view with parts broken away, illustrating the apparatus of the present invention.

The elevator means 12 illustrated in FIG. 2 comprises an upper plate 42 attached to the upper end of the piston 44 of a preferably hydraulic cylinder 46 which is mounted at or near the base of frame 20. So situated, the upper plate 42 of the elevator means 12 is vertically reciprocal between a lowermost position and any of several upper positions depending on how many courses of bricks are stacked thereon during any one cycle thereof, as will be explained more fully hereinafter.

Figure 4:
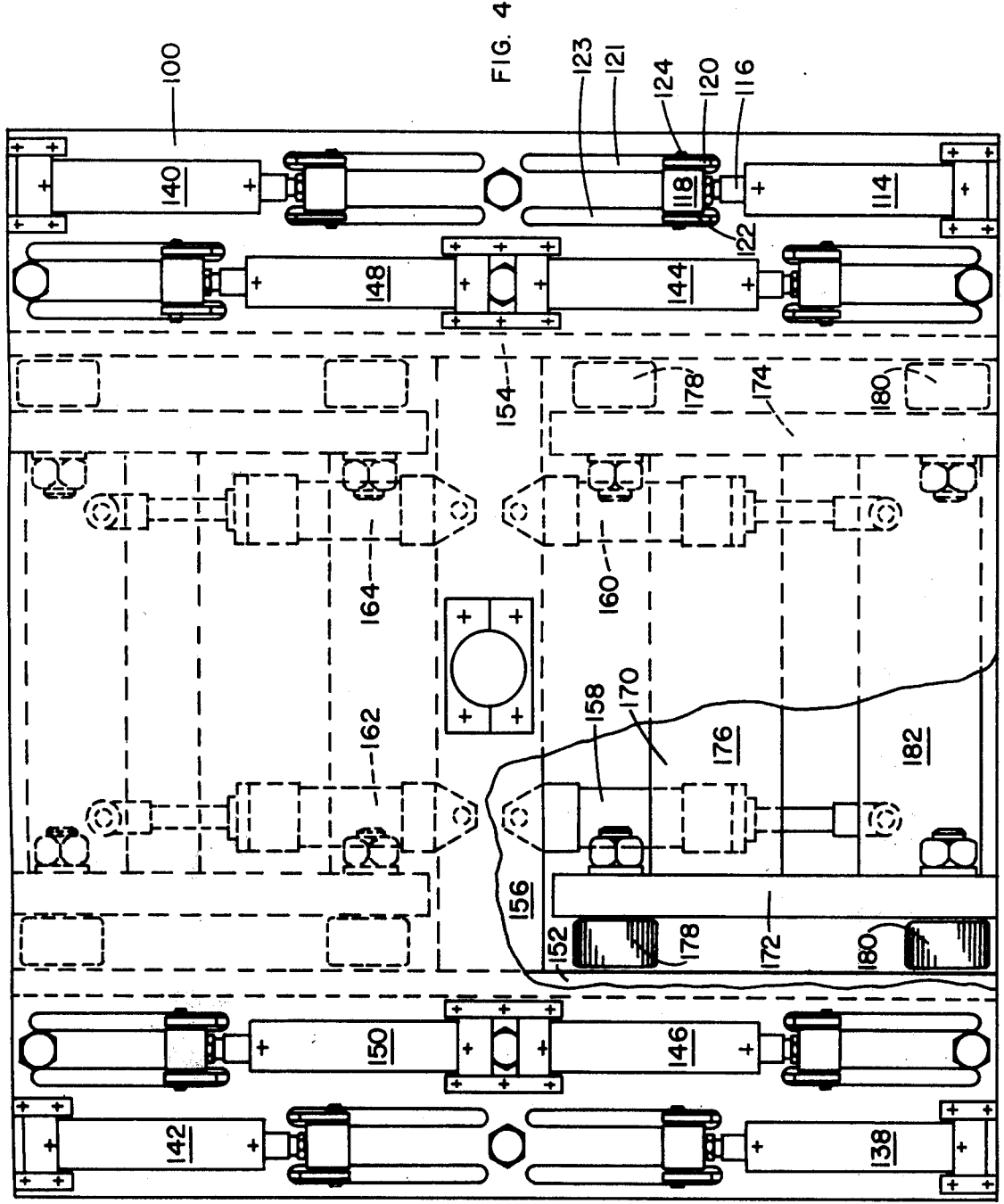
FIG. 4 is a plan view of the gripper apparatus.
Figure 5:
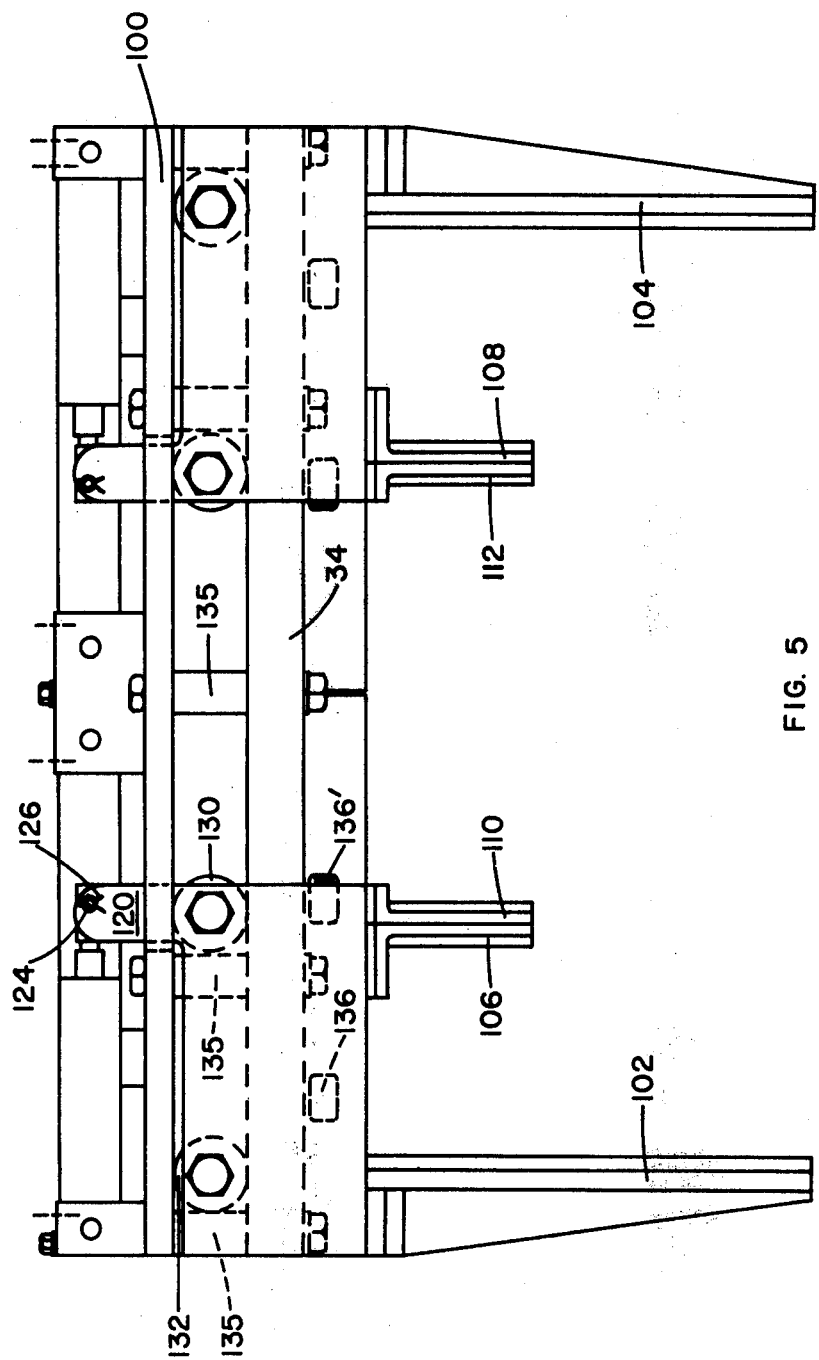
FIG. 5 is an end view of the gripper apparatus illustrated in FIG. 4.
Figure 6:
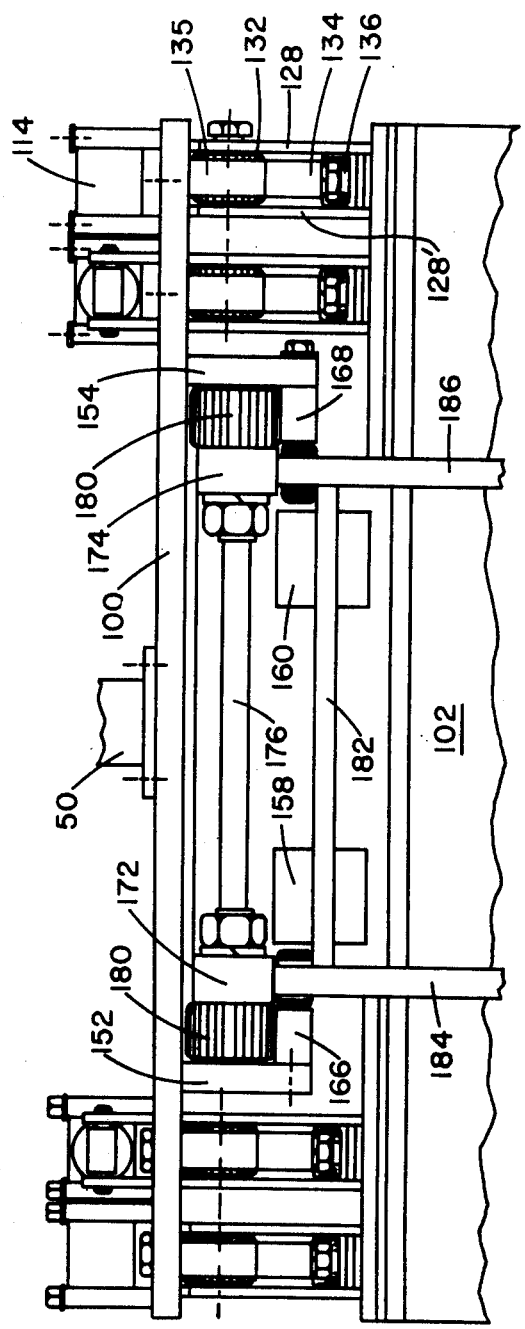
FIG. 6 is a partial elevation view of the end gripper apparatus illustrated in FIG. 4.

Turning now to FIGS. 4 through 6, the gripper means 10 is illustrated, and first of all is attached to a vertically mounted support means 49 including an upright frame 51 having assembly 50 suspended from an upper frame-work above the original framework 20. The rod of the piston and cylinder assembly 50 is secured at its lower end to the gripper means 10 in some conventional fashion. For example, a mounting plate 100 is secured to the rod of cylinder 50 and all of the elements of the gripper means 10 10 are mounted either directly or indirectly to said mounting plate 100.

The gripper means comprises in general a pair of longer outer gripper plates 102, 104 which are mechanically joined to and depend from opposite edges of mounting plate 100, although they are not in physical engagement therewith. A first inner gripper member 106, which is substantially shorter than the outer gripper member 102 is arranged to cooperate therewith for gripping a first plurality of bricks therebetween under certain conditions to be hereinafter described. A second short, inner gripper 108 similarly cooperates with the second longer outer gripper member 104 to grip a second plurality of bricks therebetween. Two other short, inner gripper members 110, 112 cooperate with each other to grip and support even a third plurality of bricks therebetween under certain conditions to be hereinafter explained.

A plurality of air cylinders 114, 138, 140, 142, 144, 146, 148, and 150 are secured to the top of plate 100 in the arrangement shown in FIG. 4. The mechanism which connects air cylinder 114 to its associated gripper blade 110 will be discussed in detail as illustrative of the same structural connection between the other air cylinders and their respective gripper blades. The piston 116 of air cylinder 114 is attached to a bearing block 118 which is secured between two upwardly extending flanges 120, 122 of a connector plates 128, 128[1]. Flanges 120, 122 extend through slots 121 and 123 respectively of plate 100. A pin 124 extends through flanges 120, 122 and through bearing block 118, and the pin is retained therein by means of a cotter 126. Flanges 120 and 122 form a yoke which extends through the openings 121 and 123 in plate 100. Gripper plate 110 is welded or otherwise attached to the lower edge of connector plate 128 so that as air cylinder 114 is activated, gripper plate 110 is moved back and forth. To facilitate the movement of connector plate 128 and gripper plate 110, roller bearings 130, 132 are rotatably connected between the connector plates 128, 128[1] and guide along a bearing track 134 which is suspended from mounting plate 100 by means of spacers 135. Additionally, stationary bearings 136 are mounted to the underside of the bearing track 134 to insure a proper linear traverse back and forth of the gripper plate and associated yoke.

In a similar manner, air cylinder 138 is attached to the other side of gripper plate 110 and cooperates with air cylinder 114 to provide a smooth and even traverse of gripper plate 110. Similarly, air cylinders 144, 146 are connected to gripper plate 106 for activation thereof; air cylinders 140 and 142 are connected to gripper plate 112 for activation thereof; and air cylinders 148, 150 are attached to gripper plate 108 for activation thereof. The mechanical connection between these latter air cylinders and their associated gripper plates are substantially the same as that for air cylinders 114 and 110 and will not be explained further.

Turning now to a description of the activating mechanism for end grippers 102, 104, first of all whereas the inner gripper activating mechanism described hereinabove is pneumatic and mounted mostly atop mounting plate 100, the outer gripper activating mechanism is hydraulic and suspended from the underside of plate 100. A pair of side mounting plates 152, 154 are welded or otherwise secured to the underside of mounting plate 100 extending across the length thereof. A cylinder mounting plate 156 is secured to and extends between the two side mounting plates 152, 154 for the purpose of mounting the cylinder end of hydraulic cylinders 158, 160, 162, and 164. A pair of inturned flanges or plates 166, 168 form tracks for a framework 170 from which end plate 102 depends.

Framework 170 includes two side bars 172, 174 with a connecting plate 176 therebetween. A pair of wheels or bearings 178, 180 are rotatably mounted to each of side bars 172, 174 and ride on tracks 166, 168 to move framework 170 back and forth. End gripper 102 is suspended from the outer end of side bars 172, 174 by means of struts 184, 186. A second connecting plate 182 extends between struts 184, 186 and is attached to the free end of the piston of cylinder assemblies 158, 160 and thereby connect the cylinders with framework 170 for activation thereof.

Figure 3:
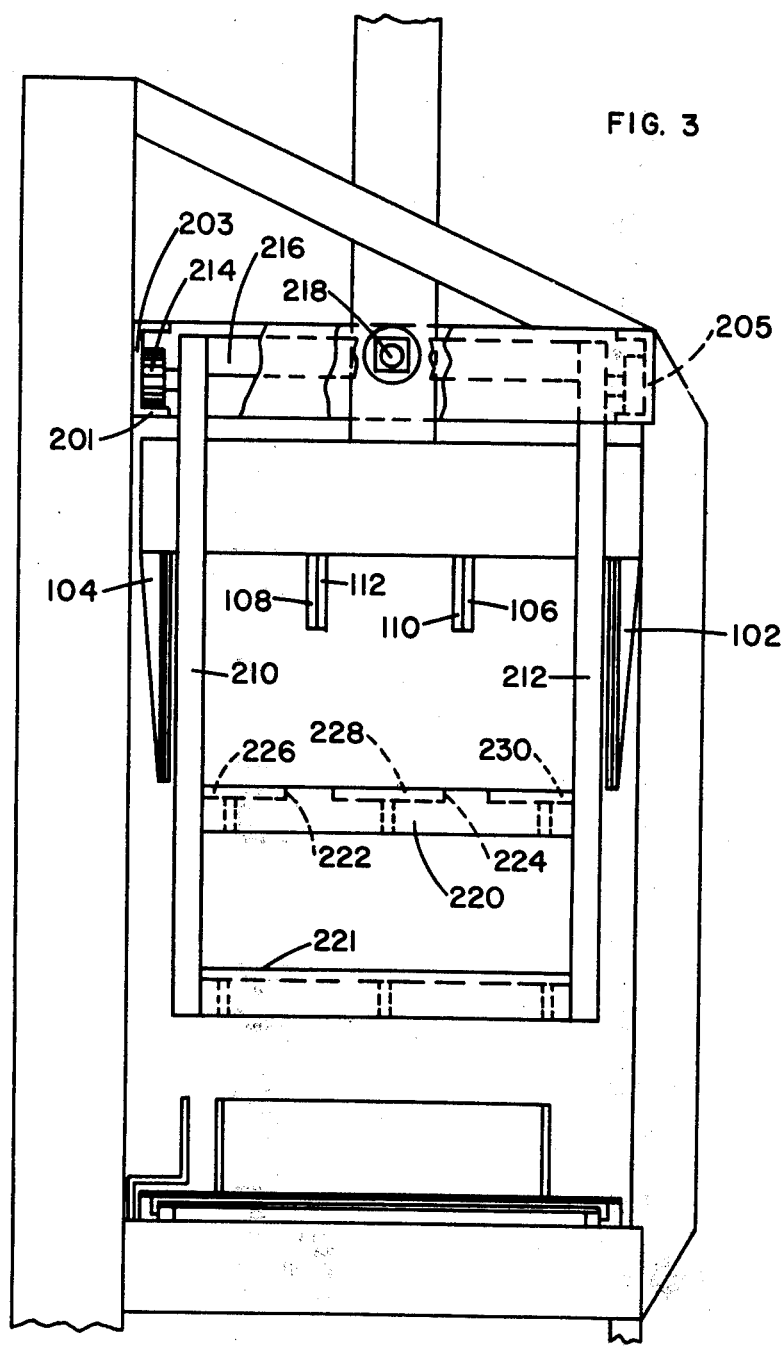
FIG. 3 is an enlarged end view of the tyne building apparatus with parts broken away for the sake of clarity.

The tyne building apparatus 18 is best illustrated in FIGS. 2 and 3 and includes an elevated framework 200 which is elevated above the main frame 20 by means of legs 202, 204, 206, 208. Framework 200 supports the hoist or cylinder for the gripping apparatus 10 described hereinabove as well as for the tyne building apparatus 18.

A pair of struts 210, 212 include rollers 214 which ride on inturned flanges 201 of the side members 203, 205 of framework 200 and support the struts which hang down therefrom. A connecting bar 216 connects the upper ends of struts 210, 212 and is attached to the free end of the piston of a hydraulic cylinder 218 thereby providing the activation necessary for reciprocating the tyne building apparatus.

The tyne openings themselves are formed by a slotted tyne tray 220 which is secured at one end to struts 210, 212 whereby the tray extends horizontally beneath the gripping apparatus 10 when in the operative position. As best seen in FIG. 3, the slots 222, 224 are so situated in the surface of the tray 220 that when the gripper apparatus releases a layer of bricks onto the tyne tray 220, the bricks to be removed fall through the openings and onto a catch tray 221 from which they may be normally removed. Then as illustrated in FIG. 7d the selected layer is in position on the slotted tray to be picked up by the inner grippers 106, 108, 110 and 112 as well as outer grippers 102, 104 as will be described hereinafter. Instead of a catch tray, an auxiliary plate (not shown) could be biased upwardly against the bottom of tyne tray 220 by springs, a counterweight, or the like. As the gripper head lowers, after the bricks are released onto tray 220, the outer grippers would engage abutments on the sides of the auxiliary plate, thus lowering it along with the tyne brick. After the inner grippers 106, 108, 110, 112 are activated and the head 10 is raised, the tyne brick return to the original position atop the tyne tray 220 from whence they are removed. In this way the brick are not dropped.

Note that inner grippers 106–112 enter the slots in tray 220 when the gripper apparatus 10 is lowered. Also when activated, the grippers engage the remaining bricks before they engage the edges of the tray surrounding slots 222, 224, which must be wider than accumulated dimensions of brick therebetween to be dropped through these slots to prevent a jam-up of the system. The inner grippers 106, 108, 110 and 120 are preferably of such a length that they engage the brick at a point above the surface of the tyne tray 220. Also, the tyne tray 220 must be of a total width less than the distance between outer grippers 102, 104.

After completion of a stack on elevator means 12, a pusher plate 250 is activated by another hydraulic cylinder assembly 252 to transfer the entire stack from the elevator plate 42 into a portable barrow 254 from whence the stack moves on to a strapping apparatus (not shown).

Turning now to the operation of the equipment, as best illustrated in the schematic representation shown in FIG. 7a–h, courses of brick as described hereinabove proceed down conveyance 16 until they reach the end adjacent the stacking apparatus. Pusher mechanism 30 then transfers the bricks, a course at a time onto receiving plate 14 which is initially in the receiving position. As described hereinabove, the receiving position may be either removed from between the gripper member 10 and elevator 12 as illustrated in FIGS. 1 and 2 or may be intermediate thereof. If the receiving plate 14 is already intermediate the gripper 10 and elevator 12, the gripping sequence begins immediately; if not, the receiving plate is moved to the intermediate position.

The gripper apparatus 10 is then lowered and grips the bricks by applying pressure against the largest side (stretchers) and thus supports the course of bricks while the receiving plate is moved away to its other position thereby providing an open path between elevator plate 42 and the underneath surface of the gripped brick course.

At this time the bricks are then suspended in mid-air above the elevator apparatus, which is activated to bring either upper plate 42 thereof or the upper level of bricks supported thereon into engagement with the lower surface of the course of bricks being supported by the gripper apparatus 10. Some type of conventional feeler mechanism or sensing switch indicates when the contact has been made between the upper plate 42 or bricks on the elevator and the lower surface of the course being held by the gripper apparatus. The elevator is stopped and the outer gripper members 102, 104 are released to deposit the course of bricks previously held thereby onto the elevator apparatus. The elevator then lowers until the upper surface of the course of bricks which was just deposited thereon is entirely below the level of the receiving plate 14, whereupon the sequence begins again and continues until a stack is complete.

When a stack of bricks, conventionally ten layers, is completed a piston and cylinder assembly 252 having a pusher plate 250 attached thereto is activated to move the stack of bricks horizontally from its position on the elevator plate into a barrow 254 which is positioned adjacent to the elevator apparatus 12. The barrow then transfers the bricks over to the strapping apparatus; however, this operation is not a part of the present invention and will not be described further.

Figure 7A:
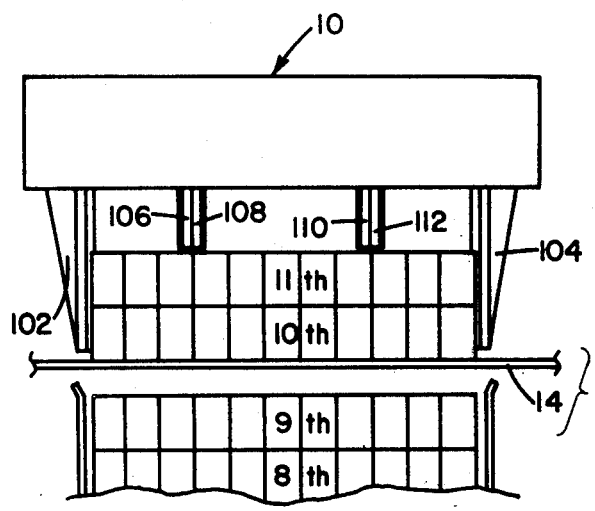
Figure 7B:
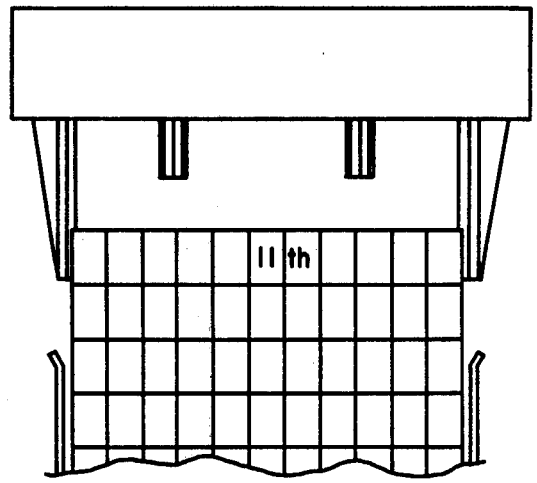
Figure 7C:
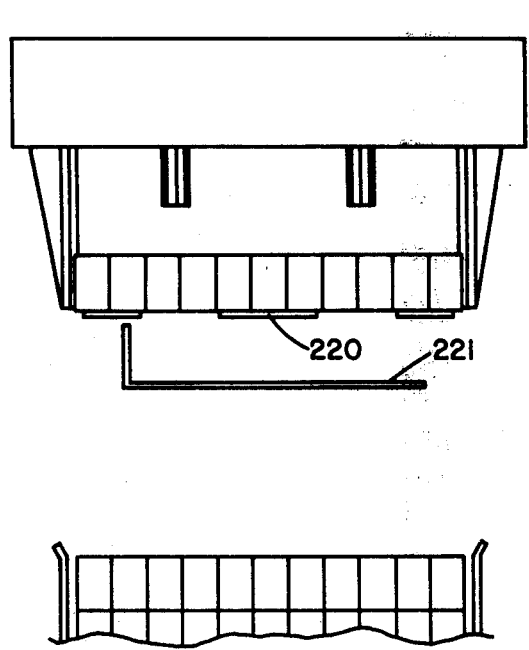
Figure 7D:
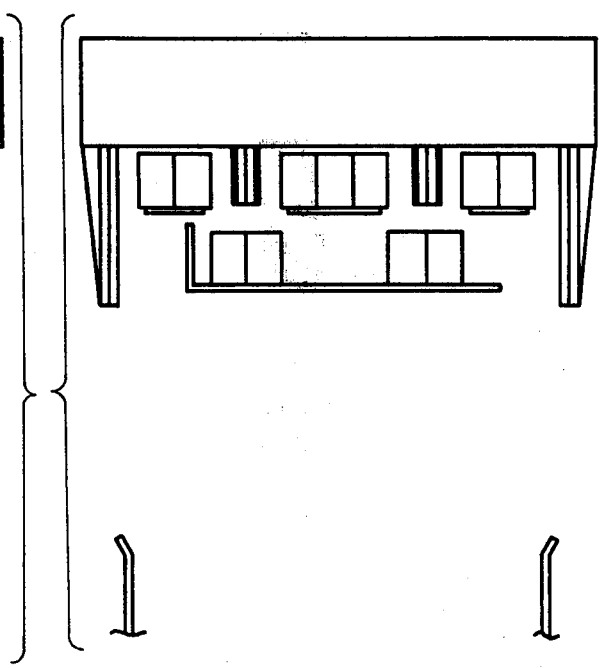

Turning now to FIGS. 7a–h, the sequential operation of the tyne building will be described. First of all, during the initial set up of the apparatus for a run of bricks, a first layer is deposited on the elevator plate 42 so that as successive layer courses are deposited, the top layer of each course forms an odd numbered layer in the stack as illustrated in FIG. 7a for reasons to be made evident hereinafter.

Beginning the description of the completion of one stack as shown in FIG. 7a, a 10th and 11th layer are deposited on receiving plate 14. The outer grippers 102, 104 are activated in the normal procedures as the receiving plate is removed, whereupon layers 10 and 11 are deposited on the previously formed stack. The gripping apparatus is raised to a point level with the eleventh course only, whereupon the outer grippers 102, 104 grip only the eleventh course and lift it as illustrated in FIG. 7b. In FIG. 11c the elevator has lowered for the push out operation as described hereinabove, and the tyne plate 220 and catch tray 221 are moved horizontally to their operative position beneath the gripper apparatus 10. The gripper head 10 places the eleventh layer onto the tyne plate 220 and the outer grippers 102, 104 are released, whereupon the tyne brick drop through the openings in the tyne plate 220 onto the catch tray 221.

The gripper apparatus 10 is then lowered so that the bricks remaining on the tyne plate are positioned between the outer grippers 102, 104 and the inner grippers 106, 108, 110, and 112 as illustrated in FIG. 7d. The interior grippers 106, 108, 110, 112 are then activated to grip and support the tyne course against outer grippers 102, 104 in the upper part of the gripping apparatus 10 (FIG. 7e), and the tyne plate 220 and catch tray 221 are returned to their normal position out from beneath the gripper head. In the meantime, another push off has occurred onto receiving plate 14 as illustrated in FIG. 7f and the gripper head lowers what was previously the eleventh layer onto the first and second layer to form the third layer. The interior grippers are then released, and the outer grippers are activated to grip all three courses as illustrated in FIG. 7g. When the receiving plate 14 has been removed and the courses deposited on the elevator apparatus 12, a conventional separator board is inserted above the third layer, and the stacking resumes as hereinbefore described.

As an alternate possibility of building the tyne layers, rather than a gripper head with outer grippers and inner grippers which all grip along the stretches, the gripper head could have outer grippers which grip along the stretchers and shorter inner grippers which grip along the headers, in which case there would be a pair of grippers for each row of tyne brick to be removed. Again, the eleventh row would be gripped between the outer grippers 102, 104 while the elevator was lowered for push out. The eleventh layer would again become the tyne course, and when the first and second courses had been pushed onto the receiving plate 14, the former eleventh layer which is now the third layer would be deposited thereon. The gripper apparatus would be lowered until the smaller end grippers could grip the rows of tyne brick to be removed, whereupon the gripper apparatus would be elevated and the tyne brick removed and placed on an auxillary plate which would be moved into position beneath the gripper head for this special purpose. After the separator board was placed on top of the third layer, stacking would resume as described hereinabove.

Although a preferred embodiment has been illustrated and described, it is apparent that various changes and modifications might be made without departing from the scope of the invention, which is set out and to be determined by the following claims.

What is claimed is:

1. A method for stacking double layer courses of cured bricks, each of said layers having a plurality of rows and columns of bricks therein, in preparation for a subsequent strapping operation, said method comprising the steps of:
   a. receiving successive ones of said courses on a receiving plate;
   b. applying gripping pressure simultaneously against all of the row ends of each successive course while still supported by said receiving plate above an elevator means;
   c. removing said receiving plate to provide open communication between said elevator means and said gripped and supported course;
   d. raising said elevator means until it reaches a point substantially in engagement with the underside of the lowermost layer of said course;
   e. releasing said course onto said elevator means;
   f. lowering said elevator means to a point where the upper surface of the uppermost layer of said course is at a point beneath the level of said receiving plate; and
   g. repeating steps (a) through (f) until a stack is formed.

2. The method of stacking double layer courses as set forth in claim 1, wherein during the formation of the stack as set forth in step (g), after step (e) has occurred in a selected cycle:
   a. applying gripping pressure against the uppermost layer of the uppermost course;
   b. spacing the uppermost course from the remainder of the stack;
   c. positioning the uppermost layer immediately above a tyne plate having openings therein corresponding to the bricks to be removed for a tyne opening and temporarily releasing the gripping pressure thereagainst;
   d. reapplying gripping pressure to the remaining bricks in the uppermost layer after the void bricks have been removed;
   e. returning said uppermost layer to a position immediately above the stack on said elevator means and releasing the gripping pressure thereagainst;
   f. placing a separator sheet atop the then existing uppermost layer which includes the tyne openings therein.

* * * * *